(12) United States Patent  (10) Patent No.: US 11,267,093 B2
Blais et al.  (45) Date of Patent: Mar. 8, 2022

(54) SYSTEM AND METHOD FOR MANAGING MACHINE TOOL MAINTENANCE

(71) Applicant: PRATT & WHITNEY CANADA CORP., Longueuil (CA)

(72) Inventors: Mario Blais, Varennes (CA); Mizanur Rahman, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 200 days.

(21) Appl. No.: 16/786,015

(22) Filed: Feb. 10, 2020

(65) Prior Publication Data

US 2021/0245318 A1  Aug. 12, 2021

(51) Int. Cl.
*B23Q 17/22* (2006.01)
*G06Q 50/04* (2012.01)
*G06Q 10/00* (2012.01)

(52) U.S. Cl.
CPC ............ *B23Q 17/22* (2013.01); *G06Q 10/20* (2013.01); *G06Q 50/04* (2013.01)

(58) Field of Classification Search
CPC ......... B23Q 17/22; G06Q 50/04; G06Q 10/20
See application file for complete search history.

(56) References Cited

U.S. PATENT DOCUMENTS

| | | | | |
|---|---|---|---|---|
| 6,326,758 | B1 * | 12/2001 | Discenzo | G05B 23/0243 318/432 |
| 6,594,589 | B1 * | 7/2003 | Coss, Jr | G05B 19/4184 702/34 |
| 6,597,464 | B2 | 7/2003 | Bucher et al. | |
| 9,622,933 | B2 * | 4/2017 | Sackner | A61H 23/006 |
| 9,770,476 | B2 * | 9/2017 | Chabot | A61K 36/539 |
| 9,971,337 | B2 | 5/2018 | Blais et al. | |
| 10,055,549 | B2 * | 8/2018 | Chung | G16Z 99/00 |
| 2004/0236450 | A1 * | 11/2004 | Bryant | G05B 23/0254 700/108 |
| 2008/0162352 | A1 * | 7/2008 | Gizewski | G16H 20/10 705/50 |
| 2009/0299767 | A1 * | 12/2009 | Michon | G16H 50/30 705/3 |
| 2010/0023156 | A1 | 1/2010 | Trepina et al. | |
| 2013/0226317 | A1 * | 8/2013 | Vijayaraghavan | G06Q 10/06 700/28 |
| 2014/0365191 | A1 * | 12/2014 | Zyglowicz | G06Q 50/06 703/7 |

(Continued)

*Primary Examiner* — Tung S Lau
(74) *Attorney, Agent, or Firm* — Norton Rose Fulbright Canada LLP

(57) ABSTRACT

There are described methods and system for managing machine tool maintenance. The method comprises assessing health data for the machine tool over health assessment cycles, the health data indicative of a performance of the machine tool; triggering first level maintenance events on the machine tool when the health data falls outside of a tolerance; modulating a time interval between the health assessment cycles as a function of an occurrence of first level maintenance events, wherein the time interval is reduced after first level maintenance events and increased after a given number of consecutive health assessment cycles without first level maintenance events; and triggering second level maintenance events on the machine tool when second level maintenance event conditions are met.

20 Claims, 5 Drawing Sheets

(56) References Cited

U.S. PATENT DOCUMENTS

2015/0106020 A1* 4/2015 Chung .................... G16Z 99/00
                                                             702/19
2017/0131710 A1* 5/2017 Chen .................. G05B 19/4065
2017/0372017 A1* 12/2017 Steffen ................... G16H 40/67

* cited by examiner

| Z5 | Maintenance 1st LEVEL | Y1 | Y2 | X1 | Y1 | Y2 | X1 | Y1 | Y2 | Y3 |
|----|----|----|----|----|----|----|----|----|----|----|

FIG. 3B

| Z5 | Maintenance 1st LEVEL | Y1 | Y2 | X1 | Y1 | X1 | X2 | X3 | Y1 | Y2 |
|----|----|----|----|----|----|----|----|----|----|----|

FIG. 3C

| Z5 | Maintenance 1st LEVEL | Y1 | Y2 | X1 | Y1 | X1 | X2 | MAINTENANCE 2ND LEVEL |
|----|----|----|----|----|----|----|----|----|

FIG. 3D

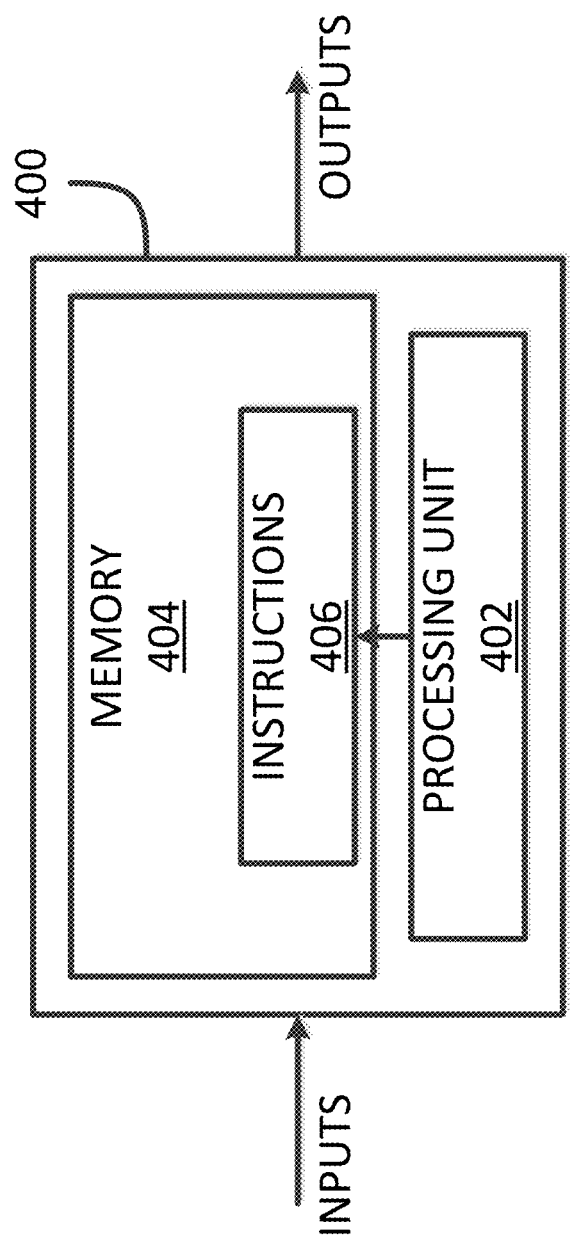

SYSTEM AND METHOD FOR MANAGING MACHINE TOOL MAINTENANCE

TECHNICAL FIELD

The present disclosure relates generally to machine tools for machining work pieces, and more particularly to maintenance strategies for machine tools.

BACKGROUND OF THE ART

Preventive maintenance is maintenance that is regularly performed on a piece of equipment to lessen the likelihood of it failing. It is performed while the equipment is still working so that it does not break down unexpectedly. However, even preventive maintenance requires down time for a machine, which can increase operation costs.

Therefore, improvements are needed.

SUMMARY

In accordance with a broad aspect, there is provided a method for managing machine tool maintenance. The method comprises assessing health data for the machine tool over health assessment cycles, the health data indicative of a performance of the machine tool; triggering first level maintenance events on the machine tool when the health data falls outside of a tolerance; modulating a time interval between the health assessment cycles as a function of an occurrence of first level maintenance events, wherein the time interval is reduced after first level maintenance events and increased after a given number of consecutive health assessment cycles without first level maintenance events; and triggering second level maintenance events on the machine tool when second level maintenance event conditions are met.

In accordance with another broad aspect, there is provided a system for managing machine tool maintenance. The system comprises a processing unit and a non-transitory computer-readable medium having stored thereon program instructions. The instructions are executable by the processing unit for assessing health data for the machine tool over health assessment cycles, the health data indicative of a performance of the machine tool; triggering first level maintenance events on the machine tool when the health data falls outside of a tolerance; modulating a time interval between the health assessment cycles as a function of an occurrence of first level maintenance events, wherein the time interval is reduced after first level maintenance events and increased after a given number of consecutive health assessment cycles without first level maintenance events; and triggering second level maintenance events on the machine tool when second level maintenance event conditions are met.

Features of the systems, devices, and methods described herein may be used in various combinations, in accordance with the embodiments described herein. More particularly, any of the above features may be used together, in any combination.

BRIEF DESCRIPTION OF THE DRAWINGS

Reference is now made to the accompanying figures in which:

FIGS. 3A-3D illustrate examples of health assessment cycle sequences; and

FIG. 4 is a block diagram of an example computing device for implementing the maintenance managing system of FIG. 1.

It will be noted that throughout the appended drawings, like features are identified by like reference numerals.

DETAILED DESCRIPTION

There is described methods and systems for managing the maintenance of a machine tool. As used herein, a machine tool refers to a machine for machining a workpiece, such as by cutting, boring, grinding, shearing, or other forms of deformation. The machine tool may employ a tool that does the cutting or shaping of the workpiece. The machine tool may have a means of constraining the workpiece and provide a guided movement of the workpiece along a tool path using relative movement between the workpiece and the machine tool. The machine tool can be powered from a variety of sources, and can be operated manually or under automatic control. In some embodiments, the machine tool is used to produce engine components, such as those found in gas turbine engines. Examples of a machine tool are various types of Numerical Control (NC) machines, such as milling machines, lathes, plasma cutters, electric discharge machines (EDM), wire EDM, multi-spindle machines, and the like. Other types of machines also apply.

Figure 1:
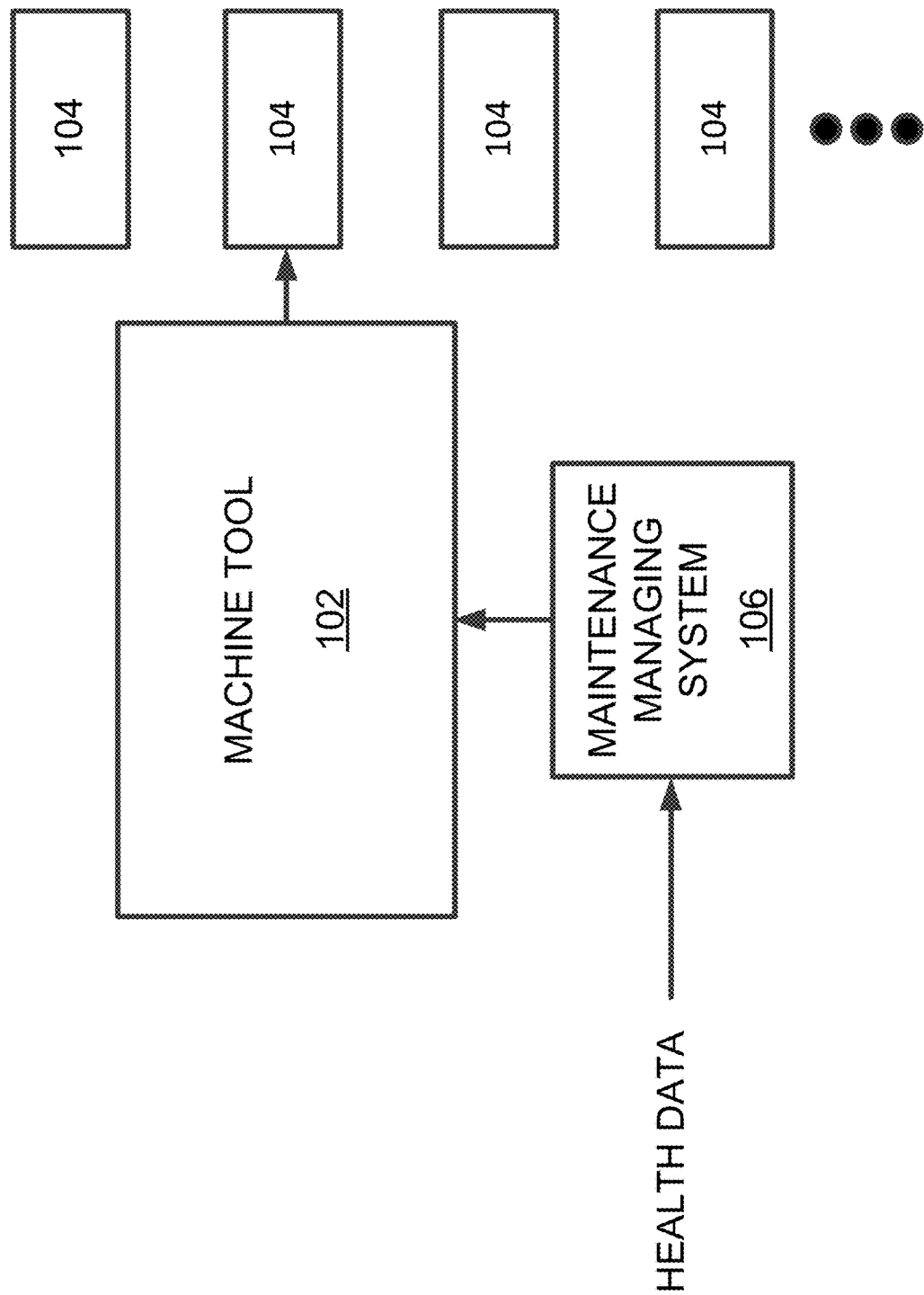
FIG. 1 is a block diagram of an example machine tool and maintenance managing system.

With reference to FIG. 1, there is illustrated an example machine tool 102 configured for machining at least one workpiece 104. A maintenance managing system 106 is coupled to the machine tool 102. The maintenance managing system 106 is configured for assessing health data for the machine tool 102 over a plurality of health assessment cycles and managing maintenance requirements as a function of the health data. Maintenance requirements may be addressed by, for example, causing a shutdown of the machine tool 102 when a maintenance is required. In some embodiments, the maintenance managing system 106 causes the machine tool 102 to trigger a maintenance through an alert or other type of signaling. Other embodiments may apply depending on practical implementations.

The health data is indicative of an accuracy level of the machine tool 102 for machining the workpiece 104 and may be obtained using direct and/or indirect methods. An example of a direct method is to measure various machine and/or workpiece parameters using one or more sensor. An example of an indirect method is to estimate various machine and/or workpiece parameters using imaging, modeling, and the like. In some embodiments, the health data comprises one or more type of error, such as a geometric error, a kinematic error, a link geometric error, etc. In some embodiments, the health data comprises a volumetric error, which represents an overall error of the machine tool 102 relating to all position and orientation directions. In some embodiments, the volumetric error includes three linear displacement errors, six straightness errors, and three squareness errors. Any known or other methods for obtaining volumetric or parametric errors of a machine tool may be used. For example, the method described in "Five axis machine tool volumetric error prediction through an indirect estimate of intra and inter axis error parameters by probing facets on a scale enriched uncalibrated indigenous artefact", by Rahman M. M. et al. in Precision Engineering, 40:94-205, 2014 may be used. Other error detection methods also apply.

Health assessment cycles refer to discrete instances in time where the health of the machine tool 102 is assessed, by comparing the health data to a baseline or a reference. The baseline or reference may be obtained from the machine tool 102 or from another machine tool of a same type and/or of a same or similar configuration. In some embodiments, the baseline or reference is obtained from a group of machines, as an average of healthy machine tool behavior. In some embodiments, the baseline or reference is obtained through simulation and/or modeling of healthy machine tool behavior. The baseline or reference may be a set of nominal parameters for the workpiece and/or for the machine tool 102, as expected when the machine tool 102 is working properly. In some embodiments, the baseline or reference takes into account a wear level or degradation of the machine tool 102, such that the baseline or reference represents an expected behavior for the machine tool 102 at a given wear level.

At each health assessment cycle, the health data is assessed by the maintenance managing system 106, for example by comparing the health data to the baseline or reference. The difference between the health data and the baseline or reference may be referred to as an error. When the error reaches a threshold, the maintenance managing system 106 triggers first level maintenance events on the machine tool 102. First level maintenance events are any process used to keep the machine tool 102 in reliable working order, including routine upkeep and corrective repair. First level maintenance events may include preventive maintenance, such as cleaning, lubrication, oil changes, adjustments, repairs, inspecting and replacing parts, and partial or complete overhauls according to a schedule. First level maintenance events may include corrective maintenance, such as repairing or replacing a defective piece of equipment. Any standard maintenance applied to machine tools may form part of the first level maintenance events.

The time interval between the health assessment cycles is modulated as a function of various parameters, such as an occurrence of first level maintenance events. After a first level maintenance event, the time interval between health assessment cycles is reduced. In other words, health data is assessed at a higher frequency than prior to the first level maintenance event. When a given number of consecutive health assessment cycles have occurred without first level maintenance events being triggered, the time interval between the health assessment cycles is increased, i.e. the health data is assessed at a lower frequency.

Depending on how the machine tool 102 performs after the first level maintenance event, the time interval may be increased or decreased again. As the machine tool 102 continues to degrade and first level maintenance events are performed more frequently, the need for replacing the machine tool may be evaluated more concretely with the data collected over the lifetime of the machine. Evaluation of the replacement of the machine tool 102 is referred to as second level maintenance events. Second level maintenance events are distinguished from first level maintenance events in that they fall outside of standard maintenance and encompass a more thorough evaluation of the need to replace the machine tool 102. Second level maintenance events are triggered when certain conditions are met. In some embodiments, the conditions for triggering second level maintenance events are that the time interval between the health assessment cycles is at a lowest interval and at least one first level maintenance event has occurred. In some embodiments, certain specific first level maintenance events are used to trigger second level maintenance events. For example, if a certain part of the machine tool is replaced and performance does not improve over a given number of assessment cycles, or if a replacement is needed for a same part for a second or third time. Generally, machine performance may be evaluated after first level maintenance events to determine the need for second level maintenance events.

Figure 2:
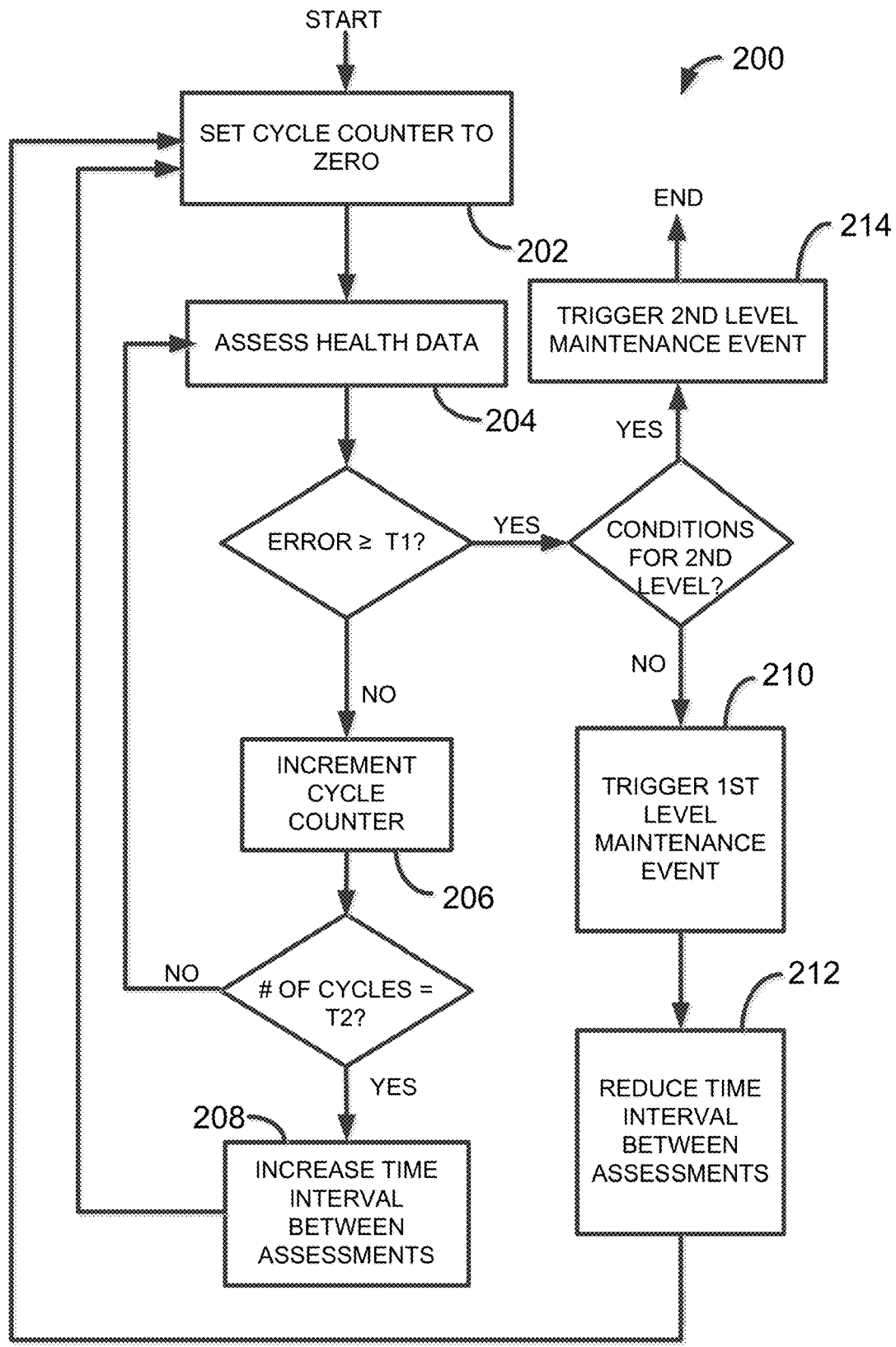
FIG. 2 is a flowchart of an example method for managing maintenance of a machine tool.

Reference is made to FIG. 2 for an example of a method 200 for managing machine tool maintenance. The method 200 starts at step 202 where a cycle counter is initially set to zero. At step 204, health data for the machine tool 102 is assessed. As stated above, the health data may comprise a volumetric error or other type of parametric error for the machine tool 102, which is compared against a tolerance (T1) for the error. When the error is within the tolerance, the cycle counter is incremented at step 206. If the number of health assessment cycles is below a threshold (T2), the method 200 returns to step 204 for assessment of the health data at another health assessment cycle. When the number of health assessment cycles reaches T2, the time interval between health assessment cycles is increased at step 208. The cycle counter is reset to zero at step 202 and the method 200 returns to step 204 to continue assessing health data in accordance with the new time interval between health assessment cycles.

When the error falls out of tolerance and the conditions for a second level maintenance event are not met, a first level maintenance event is triggered at step 210. The time interval between health assessment cycles is reduced at step 212 such that health data is assessed more frequently after a first level maintenance event than before. The cycle counter is reset to zero at step 202 and the method 200 returns to step 204 to continue assessing health data at the new reduced time interval. If the conditions for the second level maintenance event are met, the second level maintenance event is triggered at step 214.

For simplicity of illustration, a single threshold T2 has been shown in the method 200 to determine whether the time interval between health assessment cycles should be increased (at step 208) or remain the same for a subsequent assessment of health data (at step 204). In some embodiments, the threshold T2 varies from one time interval to another, as will be explained in more detail below. Also for simplicity of illustration, a single threshold T1 has been shown in the method 200 to determine whether an error is within or outside of a tolerance. In some embodiments, the assessment of the health data is more complex, as will be explained in more detail below.

Using method 200 for managing machine tool maintenance, the frequency at which the health of the machine tool 102 is assessed is modulated as a function of current and past information regarding the machine tool 102. The error tolerance T1 may be set in order to avoid making geometrically non-conform parts. Unnecessary maintenance may be avoided by increasing the time between health assessment cycles when the machine is able to maintain production tolerance.

Figure 3A:
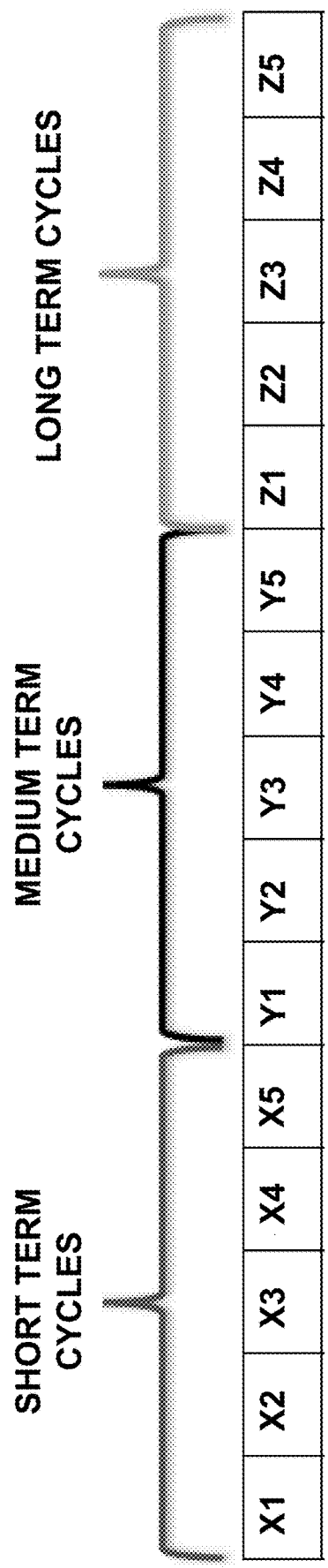

There may be two or more different time intervals between health assessment cycles. For example, in some embodiments, there are three different time intervals, referred to as short term, medium term, and long term. An example is shown in FIG. 3A. A short term time interval has a duration of X, a medium term time interval has a duration of Y (where Y>X), and a long term time interval has a duration of Z (where Z>Y). In this example, there are five health assessment cycles at a given time interval, meaning that the number of consecutive health assessment cycles performed before increasing the time interval between cycles (i.e. T2) is five.

In some embodiments, the threshold T2 may vary from one time interval to the next. For example, there may be five cycles at a duration of X, four cycles at a duration of Y, and an unlimited number of cycles at a duration of Z. In another example, there may be eight cycles at a duration of X, three cycles at a duration of Y, and ten cycles at a duration of Z. The number of cycles of the upper time interval may be fixed such that a first or second level maintenance event is triggered when it is reached, depending on the history of the machine tool. For example, a first maintenance event may automatically be triggered upon reaching the fifth health assessment cycle at the third time interval (i.e. Z5).

In some embodiments, first level maintenance events are triggered as a function of the severity of the error. A lower level of severity may cause the time interval between health assessment cycles to be reduced without triggering a first maintenance event. In some embodiments, the severity level may cause the time interval between health assessment cycles to be reduced by more than one level. An example is illustrated in Table 1.

TABLE 1

| ERROR | SEVERITY LEVEL | ACTION |
| --- | --- | --- |
| 0.5 | LOW | REDUCE TIME INTERVAL |
| 0.7 | MEDIUM | REDUCE TIME INTERVAL BY 1 LEVEL AND TRIGGER $1^{ST}$ LEVEL MAINTENANCE EVENT |
| 0.9 | HIGH | REDUCE TIME INTERVAL BY 2 LEVELS AND TRIGGER $1^{ST}$ LEVEL MAINTENANCE EVENT |

Although three severity levels are shown in the example of Table 1, more or less than three levels may be used. Indeed, the threshold T1 to which the error in the health data is compared may be composed of multiple levels, and different actions may be taken as a function of the error. The machine maintenance strategy may thus be customized in accordance with a plurality of factors, such as current time interval between health assessment cycles, previous time interval between health assessment cycles, cycle number at current time interval, severity level of an error, wear level of machine, maintenance history, and the like.

Various strategies may be used after a first level maintenance event in order to ensure stability of the machine and conformity of the parts being machined. An example is shown in FIG. 3B, where a first level maintenance event is triggered at cycle Z5. Following the first level maintenance event, two health assessment cycles are performed at time intervals of duration Y (Y1, Y2), followed by a single health assessment cycle at a time interval of duration X (X1). This sequence is repeated for another three health assessment cycles (Y1, Y2, X1). At the end of the second sequence of Y1, Y2, X1, if the machine tool is shown to be stable, then the following three cycles are at set to a time interval of duration Y (Y1, Y2, Y3).

In another example, shown in FIG. 3C, the machine has not shown the desired stability after the second instance of Y1 and three more cycles are performed at time intervals of duration X (X1, X2, X3). After the third cycle (X3), stability is reached and the two following cycles are at time intervals of duration Y (Y1, Y2).

In yet another example, shown in FIG. 3D, the threshold T2 is set to two cycles when the time interval is reduced from Y to X, after the second instance of Y1. At X2, a second level maintenance event is triggered due to the error being out of tolerance and the lowest duration of time interval being reached.

The decay rate of a machine tool 102 may be evaluated using the maintenance strategies described herein. The decay rate may depend on the frequency of first level maintenance events as well as a history of the health data being in and out of tolerance. First and second level maintenance events are performed systematically based on machine tool history and on current health data assessments, in an effort to reduce the down time of the machine tool 102 and avoid producing non-conform parts.

With reference to FIG. 4, an example of a computing device 400 is illustrated. The maintenance managing system 106 may be implemented with one or more computing devices 400. The computing device 400 comprises a processing unit 402 and a memory 404 which has stored therein computer-executable instructions 406. The processing unit 402 may comprise any suitable devices configured to implement the method 200 or any various thereof, such that instructions 406, when executed by the computing device 400 or other programmable apparatus, may cause the functions/acts/steps performed as part of the method 200 to be executed. The processing unit 402 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 404 may comprise any suitable known or other machine-readable storage medium. The memory 404 may comprise non-transitory computer readable storage medium, for example, but not limited to, an electronic, magnetic, optical, electromagnetic, infrared, or semiconductor system, apparatus, or device, or any suitable combination of the foregoing. The memory 404 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 404 may comprise any storage means (e.g., devices) suitable for retrievably storing machine-readable instructions 406 executable by processing unit 402.

The methods and systems for managing machine tool maintenance described herein may be implemented in a high level procedural or object oriented programming or scripting language, or a combination thereof, to communicate with or assist in the operation of a computer system, for example the computing device 400. Alternatively, the methods and systems for managing machine tool maintenance may be implemented in assembly or machine language. The language may be a compiled or interpreted language. Program code for implementing the methods and systems for managing machine tool maintenance may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for managing machine tool maintenance may also be considered to be implemented by way of a non-transitory computer-readable storage medium having a computer program stored thereon. The computer program may comprise computer-readable instructions which cause a computer, or more specifically the processing unit 402 of the computing device 400, to operate in a specific and predefined manner to perform the functions described herein, for example those described in the method 200.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, health data collected over time may be used to forecast machine behaviour and set the baseline or reference for other similar machines. In some embodiments, the method 200 comprises a step of setting the number of consecutive health assessment cycles that will cause an increase in the time interval between health assessment cycles. In some further embodiments, the method 200 comprises a step of varying the number of consecutive health assessment cycles that will cause an increase in the time interval between health assessment cycles, for example using the health data or based on the current or subsequent time interval to be set. Yet further modifications could be implemented by a person of ordinary skill in the art in view of the present disclosure, which modifications would be within the scope of the present technology.

The invention claimed is:

1. A method for managing machine tool maintenance, the method comprising:
    assessing health data for the machine tool over health assessment cycles, the health data indicative of a performance of the machine tool;
    triggering first level maintenance events on the machine tool when the health data falls outside of a tolerance;
    modulating a time interval between the health assessment cycles as a function of an occurrence of first level maintenance events, wherein the time interval is reduced after first level maintenance events and increased after a given number of consecutive health assessment cycles without first level maintenance events; and
    triggering second level maintenance events on the machine tool when second level maintenance event conditions are met.

2. The method of claim 1, wherein the health data comprises a volumetric error of the machine tool.

3. The method of claim 1, wherein the second level maintenance event conditions comprise the time interval reaching a lower threshold and at least one first level maintenance event having occurred.

4. The method of claim 1, wherein modulating the time interval between the health assessment cycles comprises selecting from at least three time interval durations.

5. The method of claim 1, wherein modulating the time interval between the health assessment cycles comprises increasing or reducing the time interval by one level.

6. The method of claim 1, wherein the tolerance comprises a plurality of severity levels.

7. The method of claim 6, wherein at least one of the severity levels causes a reduction in the time interval without triggering a maintenance event.

8. The method of claim 6, wherein at least one of the severity levels causes the second level maintenance events to be triggered.

9. The method of claim 1, further comprising setting the given number of consecutive health assessment cycles that causes the time interval to be increased when the time interval is increased or reduced.

10. The method of claim 9, wherein setting the given number of consecutive health assessment cycles comprises selecting the given number as a function of the health data of the machine tool.

11. A system for managing machine tool maintenance, the system comprising:
    a processing unit; and
    a non-transitory computer-readable medium having stored thereon program instructions executable by the processing unit for:
        assessing health data for the machine tool over health assessment cycles, the health data indicative of a performance of the machine tool;
        triggering first level maintenance events on the machine tool when the health data falls outside of a tolerance;
        modulating a time interval between the health assessment cycles as a function of an occurrence of first level maintenance events, wherein the time interval is reduced after first level maintenance events and increased after a given number of consecutive health assessment cycles without first level maintenance events; and
        triggering second level maintenance events on the machine tool when second level maintenance event conditions are met.

12. The system of claim 11, wherein the health data comprises a volumetric error of the machine tool.

13. The system of claim 11, wherein the second level maintenance event conditions comprise the time interval reaching a lower threshold and at least one first level maintenance event having occurred.

14. The system of claim 11, wherein modulating the time interval between the health assessment cycles comprises selecting from at least three time interval durations.

15. The system of claim 11, wherein modulating the time interval between the health assessment cycles comprises increasing or reducing the time interval by one level.

16. The system of claim 11, wherein the tolerance comprises a plurality of severity levels.

17. The system of claim 16, wherein at least one of the severity levels causes a reduction in the time interval without triggering a maintenance event.

18. The system of claim 16, wherein at least one of the severity levels causes the second level maintenance events to be triggered.

19. The system of claim 11, further comprising setting the given number of consecutive health assessment cycles that causes the time interval to be increased when the time interval is increased or reduced.

20. The system of claim 19, wherein setting the given number of consecutive health assessment cycles comprises selecting the given number as a function of the health data of the machine tool.

\* \* \* \* \*